March 29, 1955     G. R. INGELS     2,704,884
METHOD OF FORMING HARD FACING SURFACES
Filed Jan. 8, 1951     2 Sheets-Sheet 1
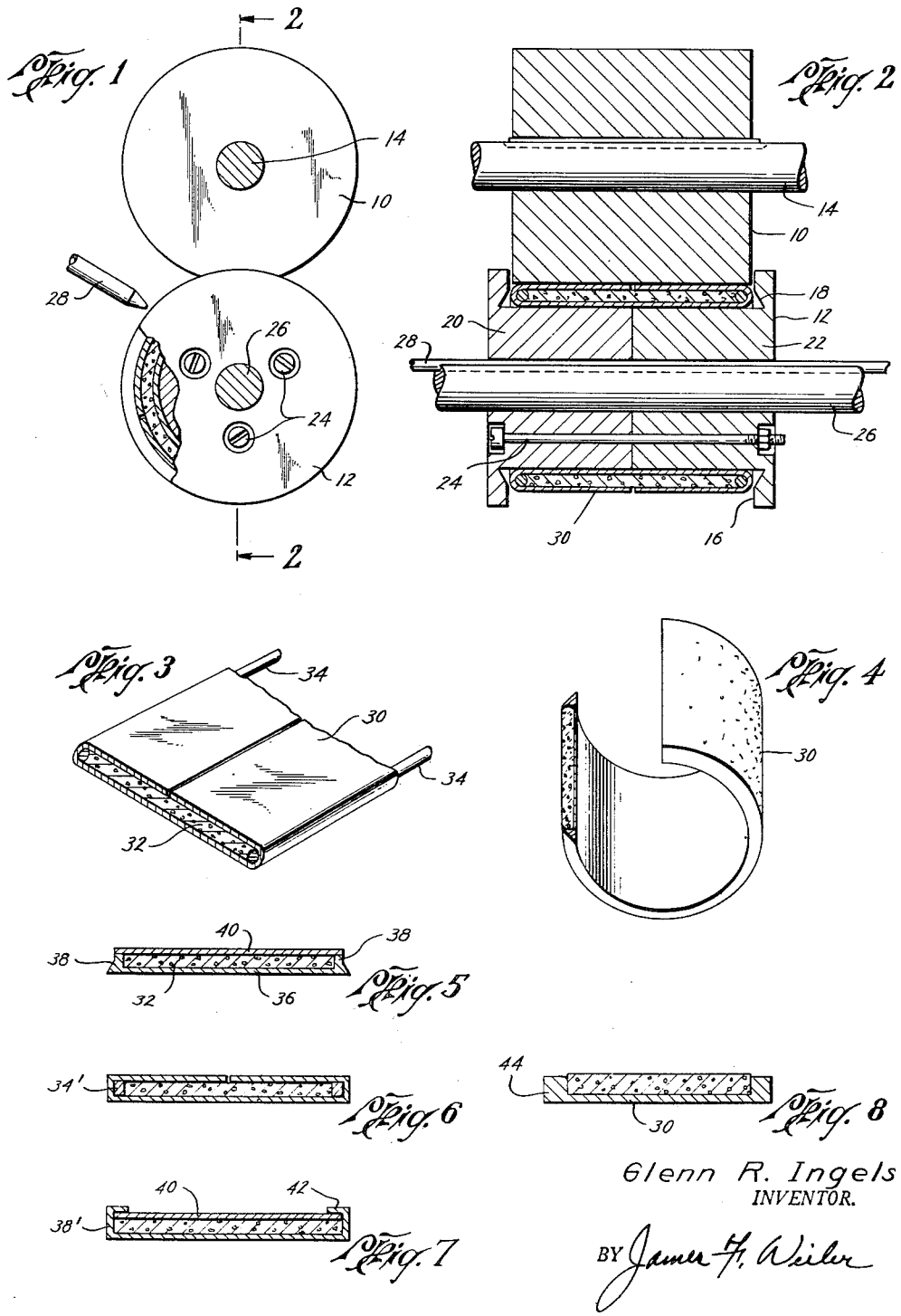
Glenn R. Ingels
INVENTOR.
BY James H. Weiler
ATTORNEY

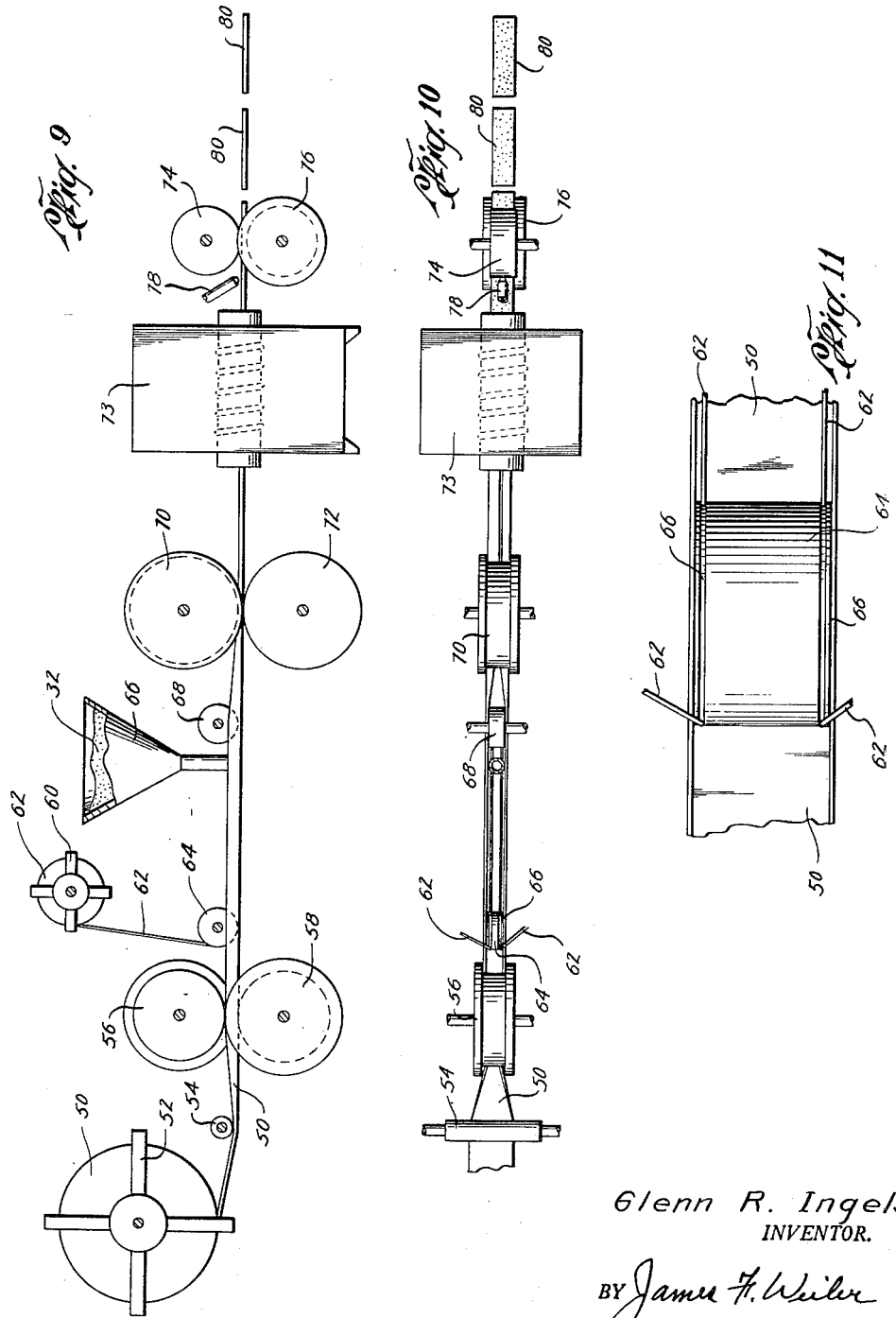

United States Patent Office 2,704,884
Patented Mar. 29, 1955

2,704,884

METHOD OF FORMING HARD FACING SURFACES

Glenn R. Ingels, Houston, Tex.

Application January 8, 1951, Serial No. 204,963

2 Claims. (Cl. 29—527)

The present invention relates to a method of preforming hard facing surfaces which may be welded to metals to give such metals an extremely hard surface of wear resistant quality.

More specifically, this invention is concerned primarily with the method of forming hard surfacing strips or blanks in which grains of extremely hard alloy are bonded by a ductile weldable binder material, as disclosed and claimed in my copending application, Serial Number 116,605, filed September 19, 1949, entitled Method of and Product for Hard Surfacing.

Heretofore in the art various tough steels and alloys have been preformed and applied to metals, the hardness of such steels and alloys ranging up to 650 Brinell, these steels and alloys being ordinarily weldable. The present invention is concerned with forming a hard surface having weldable edges that is comparable to the quality of hard surface obtained by the oxy-acetylene deposition of hard facing rods having extremely hard facing grains. For example, alloys of tungsten, cobalt and carbon are exceedingly hard and without the aid of a weldable binder material could not be successfully welded to the surface of a metal article. Such alloys have a hardness (by extrapolation) ranging to and beyond 1100 Brinell.

Prior to the development described and claimed in my copending application, Serial No. 116,605, hard facing was performed primarily by three methods using a hard surfacing rod, such as the rod described and claimed in U. S. Letters Patent No. 2,493,143 issued January 3, 1950, as well as others known to the trade. These methods may be classified as the atomic hydrogen arc welding process, the electric arc welding process and the acetylene gas method.

Each of the last mentioned methods has certain advantages and disadvantages peculiar to the particular process. For example, the atomic hydrogen arc process provides probably the fastest known method for depositing hard facing alloy grains utilizing a conventional rod upon surfaces to be hard faced, and because of the high temperature of the arc generated the base material to be surfaced or faced is only heated locally. Thus, the inherent properties in the base metal are only locally affected, and in the case of a heat treated product the surface may be hard faced after heat treatment with only local losses of the heat treated characteristics. The primary disadvantage of the above process is that due to the high temperatures generated during the arc welding of the hard facing grains to the surface many of the hard facing grains are melted thereby depositing an inferior hard facing surface. It is understood in the art that the quality of a hard surfacing deposit is measured by the number and distribution of hard metal alloy grains deposited thereon.

The electric arc welding method of applying hard surfacing rods to surfaces is similar to and has substantially the advantages and disadvantages of the atomic hydrogen arc method above described.

The acetylene gas method provides a better process for depositing a hard and wear resistant surface to metal objects than either the atomic hydrogen arc welding or electric arc welding processes. The primary advantage of the acetylene gas method appears to be that due to the lower welding temperature of the gas flame very few hard metal grains are melted and the force of the flame works the weld deposit to provide a more uniform distribution of grains. The disadvantage inherent in the acetylene gas method, however, is that in order to obtain a sufficient bond between the deposit and the base metal it is necessary that the base metal be heated uniformly to what is known in the art as the "sweating on" temperature. It is impossible to deposit the hard surfacing material by this method on a heat treated base metal without destroying the inherent heat treatment properties of the latter. Moreover, a considerable length of time is necessary to deposit the additive material on the metal surface. In addition, hard metal deposits after deposition are hard and brittle and, therefore, are not capable of being formed to a desired shape or arc welded without danger of cracking. It is of considerable advantage to the trade to be able to combine the good quality hard facing deposit provided by the gas flame method with the speed of deposition of the arc methods. The developments disclosed and claimed in my copending application provide hard surfacing articles which combine the good quality hard facing deposit of the gas flame method with the speed of deposition of the arc method and, as stated heretofore, this invention is concerned with methods of making such a hard surfacing article or product.

Accordingly, it is a prime object of this invention to provide a process of forming a surface of extremely hard particles for welding to a metal desired to be hard faced.

It is a further object of my invention to provide a method of forming such a surface having weldable edge portions whereby such surface may be easily and quickly welded to a metal surface sought to be hard faced.

It is still a further object of the present invention to provide a process for forming an extremely high wear resistant surface having a weldable backing and excess of weldable material along its edge portions whereby the surface may be readily welded as a unit to the object to be faced.

It is yet a further object of my invention to provide a process of forming an extremely hard facing, wear resistant, surfacing article in which particles of hard facing material are subjected to a relatively low heat thereby providing a minimum of melting of the hard facing particles and thereby providing a high quality hard facing deposited surface.

A still further object of my invention is the provision of such a process in which the hard surface may be preformed and shaped to the desired configuration in order that it may be quickly welded to vari-shaped surfaces desired to be hard faced.

It is a feature of my invention that the particles or grains of hard facing alloys are forged into the surface of the hard facing article thereby providing a wear resistant surface therefor, yet providing weldable backing and edge members for the hard facing alloy grains.

A further feature of my invention is the provision of such a process which is economically feasible and which provides a substantially even disbursement of hard facing alloy grains adjacent the surface portion of the finished article.

Other and further objects and features will be apparent from the following description of preferred examples of my invention, not by way of limitation but for the purposes of disclosure.

Broadly, my method comprises depositing extremely hard facing particles in an envelope of weldable material and heating one surface of the envelope to expose a surface of such hard facing particles and bind the hard facing particles to the weldable envelope. Preferably, the envelope is worked while heating one side, such as by rolling or forging. If desired the entire envelope may be heated, care being taken that only one side of the envelope is softened or melted or heated to near the melting point to expose the hard facing particles. Of course, the hard facing alloy particles may be exposed on one or more sides, such as the desired surface and its underside, but it is essential to provide weldable material by which the finished surface may be welded to a metal surface.

Preferably, the envelope of weldable material is substantially flat and sealed at one end, hard facing alloy grains being deposited therein, and the whole placed in suitable forging rollers.

The accompanying drawings illustrate suitable apparatus for use in my process, and, Fig. 1 is a side elevation, with parts broken away, illustrating a pair of rollers and torch adapted for use in my process, Fig. 2 is a sectional view taken along the line 2—2 of Fig. 1, Fig. 3 illustrates a blank or envelope adapted to be placed in the rollers of Fig. 1, Fig. 4 is a fragmentary perspective illustrating a hard facing band made in accordance with the present invention, Figs. 5, 6, 7 and 8 illustrate alternative methods of forming suitable envelopes of weldable material and hard facing grains, Fig. 9 is a diagrammatic view of a side elevation illustrating apparatus which may be used in my process when the process is continuous, Fig. 10 is a plan view of the apparatus illustrated in Fig. 8, and Fig. 11 is an enlarged, fragmentary plan view of means to insert excess material along the edges of the strip in order to provide excess weldable edges along the each side of the hard facing blank.

Referring now more particularly to the drawings and particularly Figs. 1, 2 and 3, the reference numerals 10 and 12 indicate cooperating forging rollers. As better seen in Fig. 2, the upper roller 10 has substantially straight sides and rotates about the shaft 14. The lower roller 12 has the circumferential channel 16 disposed about its outer periphery, this channel, viewed in cross-section, diverging laterally outwardly and radially inwardly as indicated by the numeral 18. As best seen in Fig. 2, the roller 12 is made up of two sections 20 and 22, in order that the band may be removed therefrom, and such sections may be secured together by any conventional means, such as by the tie rods 24. The roller 12 revolves about the shaft 26 and the torch member 28 is positioned so that the flame therefrom will play against the outer surface of the blank positioned in the channel 16 of the roller 12. The torch diagrammatically illustrated may be of the oxy-acetylene type; however, any conventional heating means may be utilized. The rollers 10 and 12 may be driven by a conventional source of power, not shown.

As best seen in Fig. 3 a strip of weldable ductile binder material 30 may be filled with grains of hard facing alloy 32, and excess weldable binder material, in the form of rods 34, is positioned on either side of the strip of the binder material 30. Thus an excess of binder material is provided along the edges of the strip, the hard facing grains 32 being disposed in the strip 30. The strip, as illustrated in Fig. 3, may then be placed or fed into the channel 16 of the rollers 12 and rolled as an oxy-acetylene flame or flames is applied to the outer surface of the strip. As the heat is applied, the upper roller 10 applies pressure to the heated surface of the strip 30 and works the binder material into intimate association with the hard facing grains, and forces the excess weld material into the downwardly diverging channels 18.

After the strip has been thoroughly heated on its outer surface and the hot material worked into the voids between the grains of hard facing particles, the strip may be removed from the rollers by uncoupling the tie members 24 and the finished hard facing band will approximate the band illustrated in Fig. 4. Inasmuch as the binder or weldable materials suitable for the purpose melt at about 2700° F. and the grains of wear resistant alloys have much higher melting points (tungsten melts at about 6000° F.) very little melting of the hard facing grains occurs in my process. Moreover, it is not necessary that the binder material be melted to successfully forge the binder and hard metal grains into intimate association, but only that the binder material be heated to a point where it may be easily and readily worked. Due to the diverging sides 18 of the channel 16, excess weldable material is provided along the extremities of the product.

As illustrated in Fig. 5 the strip of ductile weldable material may be made up of two sections, a channeled section 36 having the thickened side members 38 and a separate strip of binder material 40 positioned on top of the hard facing particles 32.

Similarly, Fig. 6 represents a modification in the envelope of binder material, the difference between the arrangements of Fig. 3 and Fig. 6 is that substantially square rod members 34' are utilized.

Fig. 7 is somewhat similar to Fig. 5, except that the vertical edges 38' have the horizontal ears 42 and the strip of binder material 40 is inserted under the overturned ears 42. In this arrangement it seems manifest that substantially thickened weldable edges will be provided during the rolling operation.

Fig. 8 illustrates a still further modification in that my weld rod described and claimed in U. S. Patent No. 2,493,143 is placed in the binder 30 having the upstanding edges 44. All of these modifications may be worked and rolled in the same manner as described in connection with Figs. 1, 2 and 3 and no more description is deemed necessary.

As indicated heretofore, binder material 30 may be cut to the desired length, sealed at one end, excess weldable binder material placed along the longitudinal edges of the strip and particles of hard facing material deposited in the strip. The envelope may then be passed to the forging rollers and heated on one side while being worked to provide a finished hard surfacing article in accordance with the invention. It seems manifest that an unlimited variety of means may be utilized to provide an "envelope" of binder material and hard facing particles to be passed to the rolling operation.

If desired, the process may be continuous, and reference is now made to Figs. 8, 9 and 10. The numeral 50 illustrates weldable binder material, which may be any suitable binder or weldable material in the art such as a mild steel, and may be in the form of a tape as illustrated and wound on reel 52.

In order to aid in depositing hard facing particles on the binder material or metallic tape 50, the latter may be formed into a convenient channel to receive the former. A centering roller 54 centers the weldable tape 50 as the latter is passed through inter-fitting channel rollers 56 and 58, respectively, thus forming the weldable material into a substantially U-shaped channel. The operation of the channel rollers is obvious and the metallic tape need not be formed into a U, but a substantial crimping of the sides is preferred in order that the material might be substantially completely rolled over later on in the process. Manifestly, the peripheral configuration of these rollers may be varied considerably.

Additional weldable material is supplied from a pair of reels 60 on which rod or wire-like ductile weldable material 62 is wound. A roller 64 having the peripheral and circumferential grooves 66 is utilized to firmly anchor the rods or wires 62 of weldable material along the lower edges of the U-shaped channel formed in the weldable tape 50 by the channel rollers 56 and 58.

The additive material 32 may consist of grains of any type of hard facing alloy or material for the desired use and may be deposited in the channel of the tape 50 by means of the hopper 66.

After the weldable rods or wires 62 and the hard facing particles 32 are added, the strip may be centered by the centering roller 68 and passed to the crimping rollers 70 and 72 which roll the tape into an "envelope" substantially the same, viewed in cross-section, as illustrated in Fig. 3.

It is desirable to heat the metallic weldable material to a temperature range where it may be easily worked and, for this purpose, a conventional furnace or heating means diagrammatically shown as 73 is provided.

After heating, the envelope may be passed to the rollers 74 and 76 and the torch 78 may be provided to assure that one surface of the envelope is softened or melted or heated close to the melting point whereby the surface of the finished product will be substantially free of ductile weldable material thereby exposing the particles of hard surfacing grains. As illustrated, the finished hard facing band may be cut into desired lengths for use, such being indicated by the reference character 80.

Many changes may be made within the spirit of the invention. For example, a plurality of rollers may be utilized in place of each set of rollers illustrated in order to provide the desired result. If desired, the heating means 73 may be omitted and a series of forging rollers and torches may be utilized. It is important, however, that one side of the envelope be heated to a point where it may be easily worked in order that such side may be readily or easily worked or forged into the interstices between the grains of additive material thereby bonding the latter to the weldable backing and sides and providing an exposed surface of hard facing alloy particles.

Broadly my invention comprises providing an envelope of weldable material, preferably providing an excess of weldable material about its edges, depositing hard facing particles in the envelope and thereafter heating at least one side of the envelope in order that the weldable material proximate that side may be readily and easily worked into intimate association with the hard facing particles thereby bonding the hard facing particles to the weldable backing and sides and forming a finished hard facing surfacing article which may be readily and easily secured to a surface desired to be hard faced.

From the above description it is obvious that various changes may be made in the invention without departing from the spirit thereof or the scope of the annexed claims.

I claim:

1. In a process of making a unitary hard facing article from an envelope of binder material having hard facing particles held therein, said hard facing article having a wear resistant surface extending along one side and having exposed binder material on the other sides whereby the article may be welded as a unit to a surface to be hard faced, the improvement comprising applying heat to the surface of said one side until said one side is in a state of substantial plasticity, said heat being applied without substantial melting of the other sides, and working said one side while in such state of substantial plasticity into intimate and bonding contact with such hard facing particles and until the particles on said one side are substantially exposed.

2. In a process of making a unitary hard facing article from an envelope of binder material having particles of hard facing grains held therein, said hard facing article having a wear resistant surface extending along one side and having exposed binder material on the other sides whereby the article may be welded as a unit to a surface to be hard faced, the improvement comprising providing an excess of weldable binder material internally of the envelope and along edges thereof before the envelope is closed, closing the envelope, applying heat to said one side until said one side is in a state of substantial plasticity, said heat being applied without substantial melting of the other side, and working said one side while in such state of substantial plasticity into intimate and bonding contact with such hard facing grains until the grains on said one side are substantially exposed.

References Cited in the file of this patent

UNITED STATES PATENTS

| Number | Name | Date |
|---|---|---|
| 1,956,462 | Knuth | Apr. 24, 1934 |
| 1,977,128 | Hawkins | Oct. 16, 1934 |
| 2,250,561 | Wissler | July 29, 1941 |
| 2,299,877 | Calkins | Oct. 27, 1942 |
| 2,367,286 | Keeleric | Jan. 16, 1945 |
| 2,394,047 | Elsey | Feb. 5, 1946 |
| 2,409,422 | Egan | Oct. 15, 1946 |
| 2,414,510 | Doyle | Jan. 21, 1947 |
| 2,427,517 | Wilson | Sept. 16, 1947 |
| 2,493,143 | Ingels | Jan. 3, 1950 |

FOREIGN PATENTS

| Number | Country | Date |
|---|---|---|
| 350,608 | Great Britain | June 18, 1931 |